(12) United States Patent
Kaufmann et al.

(10) Patent No.: US 12,032,684 B2
(45) Date of Patent: Jul. 9, 2024

(54) METHOD FOR DETECTING A FAULT INJECTION IN A DATA PROCESSING SYSTEM

(71) Applicant: NXP B.V., Eindhoven (NL)

(72) Inventors: Lars Kaufmann, Neu Wulmstorf (DE); Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 268 days.

(21) Appl. No.: 17/648,041

(22) Filed: Jan. 14, 2022

(65) Prior Publication Data

US 2023/0229759 A1 Jul. 20, 2023

(51) Int. Cl.
*G06F 21/54* (2013.01)
*G06F 11/263* (2006.01)

(52) U.S. Cl.
CPC ............ *G06F 21/54* (2013.01); *G06F 11/263* (2013.01); *G06F 2221/033* (2013.01)

(58) Field of Classification Search
CPC ...... G06F 21/54; G06F 21/125; G06F 21/554; G06F 11/263
See application file for complete search history.

(56) References Cited

U.S. PATENT DOCUMENTS

| | | | |
|---|---|---|---|
| 5,894,549 A | 4/1999 | Cheng | |
| 8,423,835 B2 | 4/2013 | Fuhrmann et al. | |
| 9,523,736 B2 | 12/2016 | Hershman et al. | |
| 10,013,581 B2 | 7/2018 | Hershman | |
| 10,678,927 B2 | 6/2020 | Srinivas et al. | |
| 10,747,877 B2 | 8/2020 | Bailly et al. | |
| 10,990,682 B2 | 4/2021 | Margalit | |
| 11,082,202 B2 | 8/2021 | Yanamadala et al. | |
| 2008/0016365 A1* | 1/2008 | Moskowitz ........... | G06F 21/125 713/176 |
| 2011/0126085 A1 | 5/2011 | Teglia et al. | |

(Continued)

FOREIGN PATENT DOCUMENTS

| | | |
|---|---|---|
| EP | 2264596 A1 | 12/2010 |
| EP | 2264596 B1 | 1/2012 |

(Continued)

OTHER PUBLICATIONS

Bassham III, Lawrence E.; "The Advanced Encryption Standard Algorithm Validation Suite (AESAVS)"; National Institute of Standards and Technology Information Technology Laboratory Computer Science Division; Nov. 15, 2002.

*Primary Examiner* — Nam T Tran
(74) *Attorney, Agent, or Firm* — Daniel D. Hill (57) ABSTRACT

A method for detecting a fault injection is described. The method includes providing a secondary code, the secondary code including a predetermined function with a known expected result when the secondary code is executed with a known tested input. A primary code is executed in the data processing system. The primary code may be a portion of code that requires protection from a fault injection attack, such as for example, security sensitive code. The secondary code is executed in parallel with the primary code execution in the data processing system to produce an output. The output is compared with the known expected result to detect the fault injection attack of the data processing system. In one embodiment, the secondary code is not related to the primary code.

17 Claims, 10 Drawing Sheets

(56) References Cited

U.S. PATENT DOCUMENTS

| | | | | |
|---|---|---|---|---|
| 2015/0185268 | A1* | 7/2015 | Falk | G06F 21/55 |
| | | | | 702/117 |
| 2017/0344310 | A1* | 11/2017 | Peeters | G06F 21/554 |
| 2019/0370473 | A1* | 12/2019 | Matrosov | G06F 21/54 |
| 2020/0218808 | A1* | 7/2020 | Hershman | G06F 21/554 |
| 2020/0257802 | A1 | 8/2020 | Srinivas et al. | |
| 2020/0257805 | A1* | 8/2020 | Courousse | G06F 21/50 |
| 2021/0133314 | A1 | 5/2021 | Wang et al. | |

FOREIGN PATENT DOCUMENTS

| | | |
|---|---|---|
| EP | 3324324 A1 | 5/2018 |
| EP | 3360073 B1 | 8/2019 |
| EP | 3584737 A1 | 12/2019 |
| FR | 2963128 A1 | 1/2012 |

\* cited by examiner

METHOD FOR DETECTING A FAULT INJECTION IN A DATA PROCESSING SYSTEM

BACKGROUND

Field

This disclosure generally relates to data processing, and more particularly, to a method for detecting a fault injection in a data processing system.

Related Art

Fault injection attacks are non-invasive attempts to inject a "glitch" into a device in order to change program execution in the device. The idea behind a fault injection attack is to corrupt the normal execution flow of the device and make it produce a faulty result during a computation. A glitch may be a power supply or other voltage glitch, a clock glitch, electromagnetic fault injection (EMFI), a laser shot at the device, or the like. The attacker may attempt to inject the glitch at a particular point in program execution to cause the program execution to take a wrong branch, to skip a step of the program, or some other wrong decision. The glitch attack may allow an attacker to skip a mathematically complex cryptographical operation such as a signature verification during a secure booting process, and thus execute unauthorized code or gain access to a secure data processing system.

A common target of fault injection attacks is security sensitive parts of code that influence the security of the entire system such as for example: secure boot, cryptographic signature verification, checksum verification as well as encryption or decryption of data. A common way to protect the device against fault injections is to implement a fault injection detection mechanism. If such detection mechanism detects a fault, then an indication the fault is occurring is provided, and the device can take actions to mitigate issues related to the fault injection, for example: restart the computation, reset itself or even erase some secrets such as cryptographic keys and passwords to prevent their extraction.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a method for detecting a glitch, or a fault injection, in a data processing system. In the method, a secondary code is run in parallel with a primary code subject to attack. The primary code may be a security sensitive code that needs protection from fault injection attacks. The secondary code includes a function and will always produce a known expected result when run on known tested inputs. The known expected results are pre-computed and may be loaded and saved to a file or table on the data processing system. If the result of the execution of the secondary code does not match the known expected result, a fault has occurred during the secondary code execution. The secondary code may run continuously, may run only during a selected security sensitive operation, or intermittently. The secondary code does not have to be related to the primary code in any way to detect a fault.

In accordance with an embodiment, there is provided, a method for detecting a glitch in a data processing system, the method including: providing a secondary code, the secondary code including a predetermined function with a known expected result when executed with a known tested input; executing a primary code in the data processing system; executing the secondary code in parallel with the primary code in the data processing system to produce an output; and comparing the output with the known expected result to detect the fault injection attack of the data processing system. The primary code may be a security sensitive code. The method may further include providing the secondary code with a plurality of functions and executing the secondary code on a plurality of inputs to produce a plurality of outputs, and wherein each output of the plurality of outputs is compared to a corresponding known expected result of a plurality of known expected results of execution of the secondary code to detect the fault injection attack. The method may further include providing the secondary code with a plurality of functions, wherein each function of the plurality of functions is executed in a serial order to produce a final output, and wherein the final output is compared to a known expected result of execution of the secondary code to detect the fault injection attack. The method may further include providing the secondary code with a plurality of functions, wherein execution of each function of the plurality of functions has an expected known result, wherein each function of the plurality of functions is executed in a serial sequence to produce a plurality of serial outputs, and wherein each output of the plurality of outputs is compared to a corresponding known expected result of a plurality of known expected results of the plurality of serial outputs. Executing the secondary code in parallel with the primary code may include beginning execution of the secondary code at the same time as or before beginning execution of the primary code and ending execution of the secondary code at the same time as or after ending execution of the primary code. Executing the primary code and the secondary code may further include executing the primary code on a first processor core of the data processing system and executing the secondary code on a second processor core of the data processing system. Executing the primary code and executing the secondary code may further include using randomized intervals of primary and secondary code execution on a single processor of the data processing system. The method of may include providing an indication that the output and the known expected result do not match. Executing the secondary code may further include executing a plurality of secondary codes in parallel with the primary code, each of the plurality of secondary codes having different code lengths and different beginning times.

In another embodiment, there is provided a method for detecting a fault injection attack in a data processing system, the method including: providing a secondary code, the secondary code including a predetermined function with a known expected result; executing a security sensitive code in the data processing system; executing the secondary code in parallel with execution of the security sensitive code in the data processing system to produce an output; and comparing the output with the known expected result to detect the fault injection attack of the data processing system. The method may further include providing the secondary code with a plurality of functions and executing the secondary code on a plurality of inputs to produce a plurality of outputs, and wherein each output of the plurality of outputs is compared to a corresponding known expected result of a plurality of known expected results of execution of the secondary code to detect the fault injection attack. The method may further include providing the secondary code with a plurality of functions, wherein each function of the plurality of functions is executed in a serial order to produce a final output, and wherein the final output is compared to a known expected result of execution of the secondary code to detect the fault injection attack. The method may further include providing the secondary code with a plurality of functions, wherein execution of each function of the plurality of functions has an expected known result, wherein each function of the plurality of functions is executed in a serial sequence to produce a plurality of serial outputs, and wherein the each output of the plurality of outputs is compared to a corresponding known expected result of a plurality of known expected results of the plurality of serial outputs. Executing the secondary code in parallel with the security sensitive code may include beginning execution of the secondary code at the same time as or before beginning execution of the security sensitive code and ending execution of the secondary code at the same time or after ending execution of the security sensitive code. Executing the security sensitive code and the secondary code may further include executing the security sensitive code on a first processor core of the data processing system and executing the secondary code on a second processor core of the data processing system. Executing the security sensitive code and executing the secondary code may further include using randomized intervals of the security sensitive code and the secondary code execution on a single processor of the data processing system. The method may further include providing an indication that the output and the known expected result do not match. Executing the secondary code may further include executing a plurality of secondary codes in parallel with the security sensitive code, each of the plurality of secondary codes having different code lengths and different beginning times. The secondary code may include a hash function or an encryption function.

Figure 1:
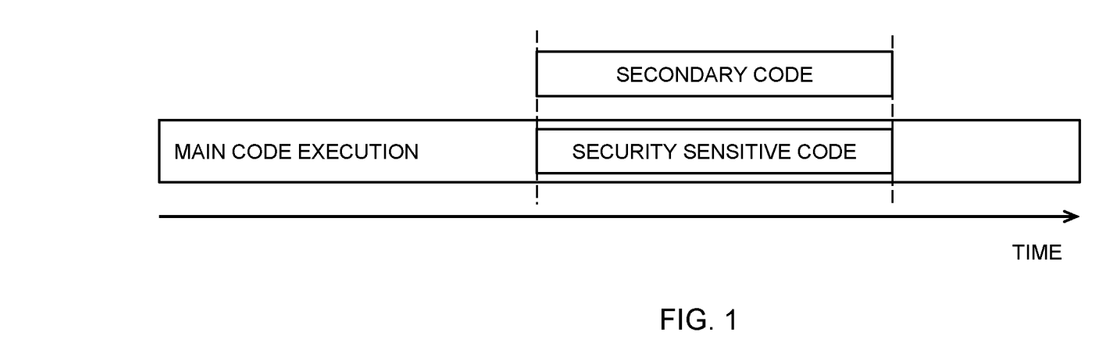
FIG. 1 illustrates a timing diagram of secondary code execution in parallel with a primary code execution in accordance with an embodiment.

FIG. 1 illustrates a timing diagram of secondary code execution in parallel with a primary code execution in accordance with an embodiment. The primary code may be a security sensitive code such as secure boot, cryptographic signature verification, checksum verification as well as encryption or decryption of data. The secondary code includes a function that is run on known tested inputs and thus will always have known expected results. The secondary code is not related to the primary code and execution of the secondary code does not affect execution of the primary code. If the result of the execution of the secondary code does not match the expected known result, a fault occurred in the processing while the device was operating. The fault may be due to a fault injection attack, or a simple random glitch. Execution of the secondary code does not disclose any information about what caused the glitch, only that it happened. The secondary code can run all the time or only during some selected times.

Figure 2:
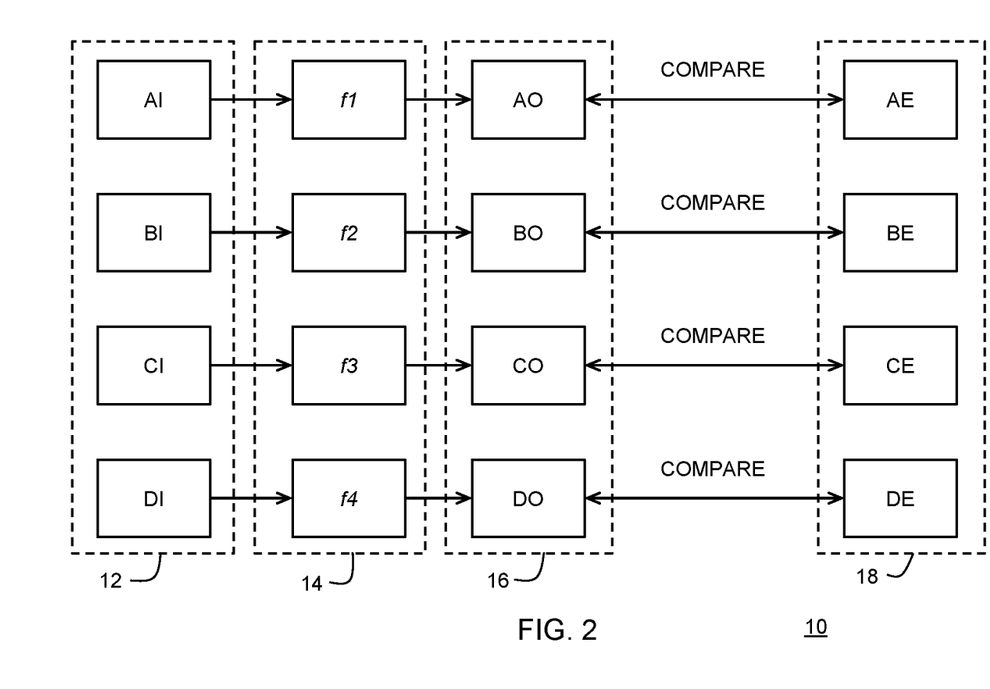
FIG. 2 illustrates secondary code execution with multiple functions, inputs, and outputs in accordance with an embodiment.

FIG. 2 illustrates secondary code execution 10 with a plurality of functions 14 represented by functions f1-f4, inputs 12 (AI-DI), outputs 16 (AO-DO), and known expected results 18 (AE-DE) in accordance with an embodiment. The functions 14 are run with the inputs 12 to compute outputs 16 that are then compared with the precomputed known expected results 18. The secondary code can use a variety of different functions, complex as well as simple, including single instructions such as addition, multiplication, or binary exclusive OR (XOR). For more complex functions the secondary code can use functions that are known to produce different results if even a single bit was changed anywhere in the input, for example, hash functions or encryption functions. Note that functions 14 do not have a useful purpose with respect to execution of the primary code except for fault detection. The functions 14 can have one or more parameters. It is also possible to use several different functions f1, f2, . . . f4 for the computations in the secondary code. As shown in FIG. 2, a list or table of inputs 12 is generated and the functions 14 are run on all these inputs to create a list or table of outputs 16. The secondary code of inputs 12, functions 14, and known expected results 18 are loaded into the processor. In one embodiment, the known expected results are saved to a secure memory. When the processor executes some sensitive code such as cryptographic algorithms or access rights verification, the secondary code runs the functions f1-f4 on the corresponding inputs 12 while checking if the outputs AO-DO correspond to the known expected results AE-DE. If all outputs AO-DO match the known expected results computed in advance, then it is likely that there was no fault injection during the code execution. The lists with known inputs and corresponding outputs are stored and thus lead to an increase in a memory usage of the processor which may be an issue for processors with only a small amount of memory.

Figure 3:
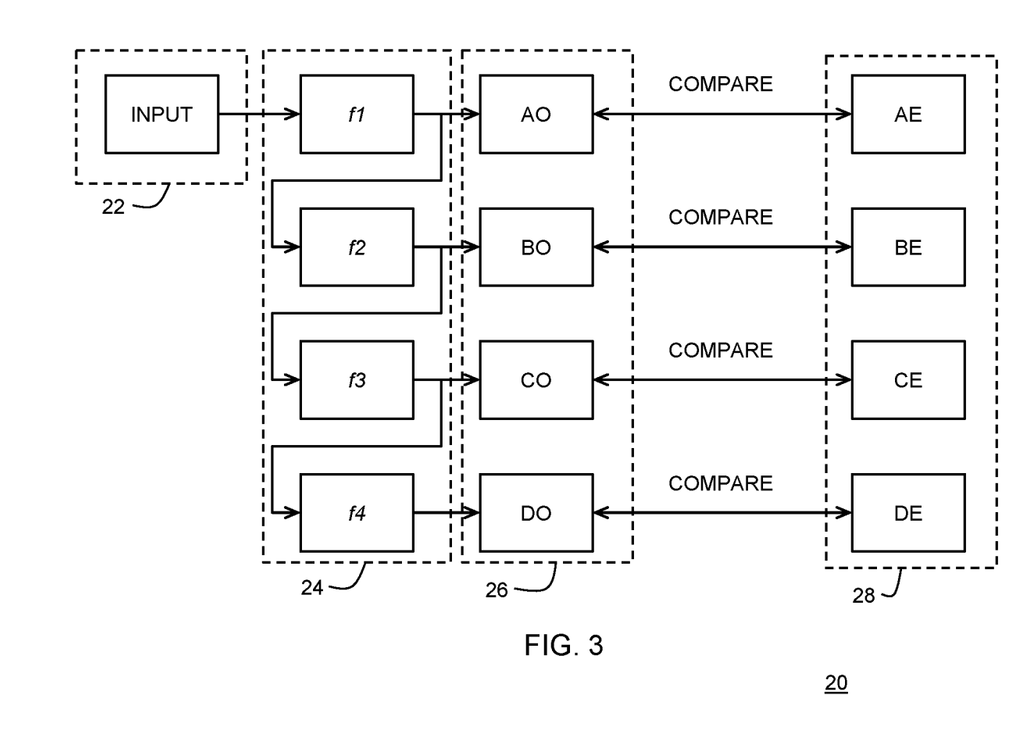
FIG. 3 illustrates secondary code execution with multiple functions executed serially to provide multiple outputs in accordance with an embodiment.

FIG. 3 illustrates secondary code execution 20 with one input 22, multiple functions 24 executed in a serial order to provide multiple outputs 26 in accordance with an embodiment. The embodiment of FIG. 3 reduces memory storage requirements by only using one initial input 22 for the functions 24, while subsequent values used for the inputs to subsequent stages are outputs 26 of each of functions 24 in turn. After running the secondary code, the outputs 26 are compared to expected known results 28. If they all match, then no fault injection was detected. Note that functions 24 can be the same function repeated multiple times or different functions.

Figure 4:
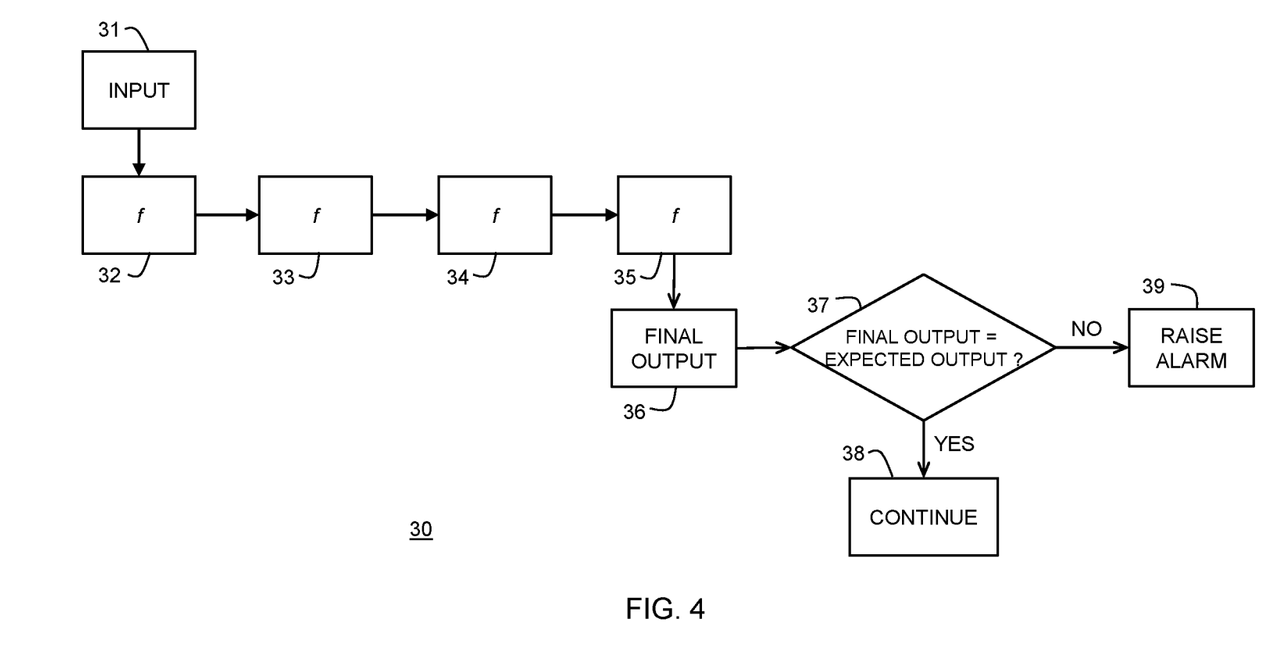
FIG. 4 illustrates secondary code execution with a single function executed multiple times to generate a single final output in accordance with an embodiment.

FIG. 4 illustrates secondary code execution 30 with a single input 31 and a single function executed multiple times 32-35 in a serial sequence to generate a single final output 36 in accordance with an embodiment. Moreover, it also possible to reduce the requirements for the storage of the final output 36 by only comparing 37 final output 36 with a known expected output. If they match, no fault was detected, and processing continues 38. If the final output 36 does not match the known expected result, then an alarm is raised 39 to allow an appropriate action in response. Note, because processing is serial, a device would need more time to detect that an error or fault occurred during the computations. Some hybrid approaches are also possible. For example, instead of checking the result of each output of the function f and instead of waiting for the very last result to execute, it is possible to check every $2^{nd}$, $3^{rd}$ or $N^{th}$ result of the function f against expected outputs. This would balance fault detection speed and the storage required for the expected results and inputs.

Figure 5A:
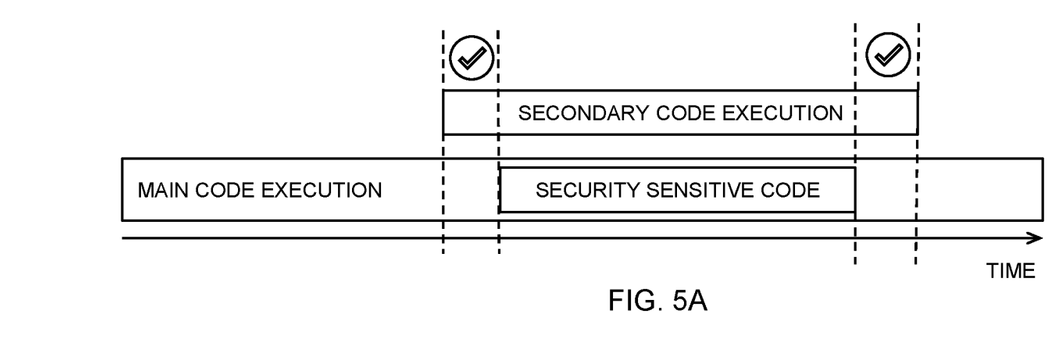
FIGS. 5A and 5B illustrate good and bad code alignment of the secondary code with the security sensitive code in accordance with an embodiment.
Figure 5B:
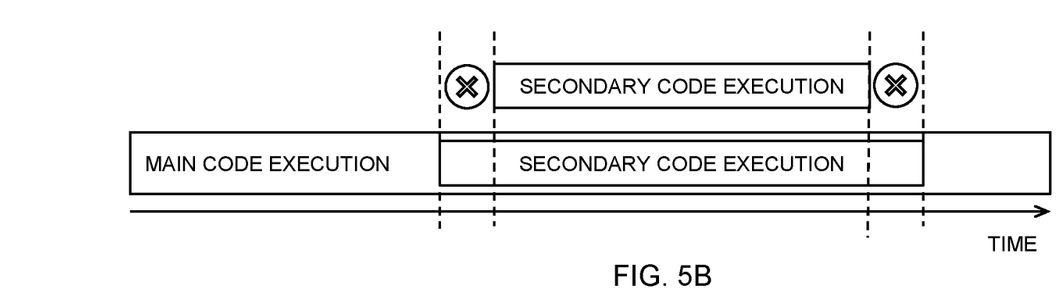

FIGS. 5A and 5B illustrate good and bad code alignment, respectively, of the secondary code with respect to the primary code in accordance with an embodiment. The time that it takes the secondary code to run should be greater or at least equal to the time that the primary code (code requiring protection) needs to compute the results as shown in FIG. 5A. Ideally, the secondary code has to start execution before the primary code and finish later to ensure the primary code execution is covered. However, as shown in FIG. 5B, if the primary protected code execution starts before the secondary code execution, then an attacker can inject a fault at the beginning of the primary code execution before the secondary code has begun execution. Similarly, an attacker can inject a fault at the end of the primary code execution if it's not covered by the execution of the secondary code.

Figure 6:
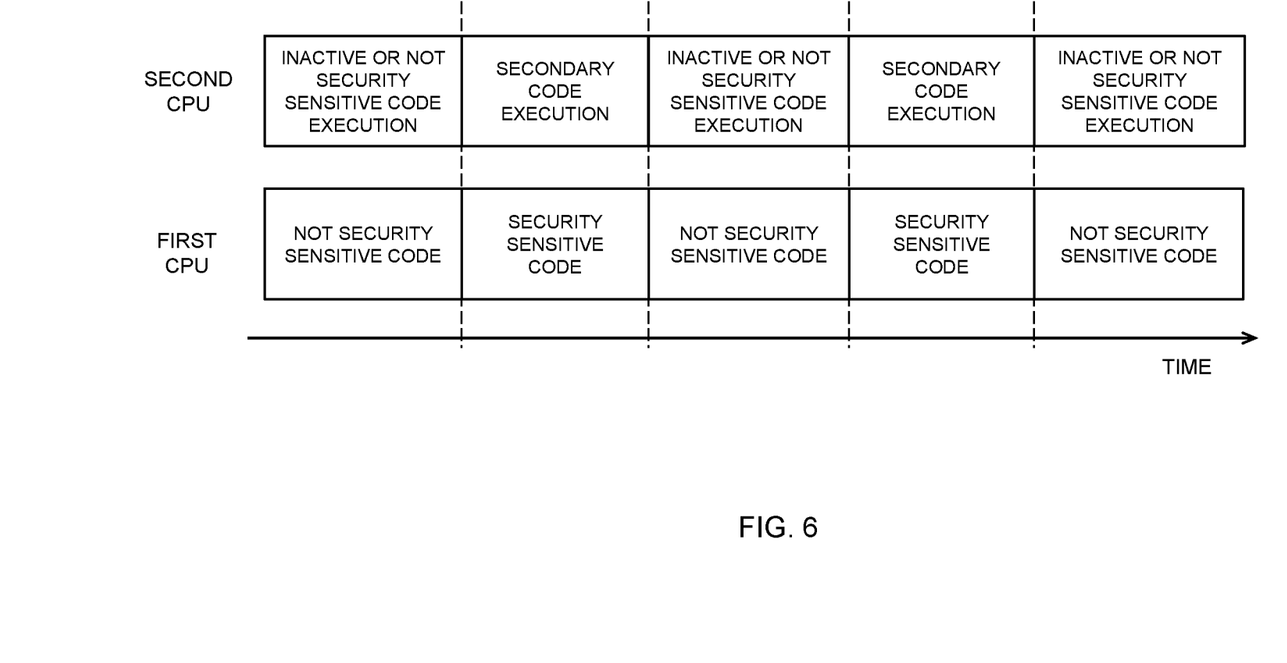
FIG. 6 illustrates a timing diagram of secondary code execution and security sensitive code execution on multiple processors in accordance with an embodiment.

FIG. 6 illustrates a timing diagram of an example of secondary code execution and security sensitive code execution on multiple processors in accordance with an embodiment. There are multiple ways of running the secondary code in parallel with the primary code that is being protected from potential fault injections. One way is to use a second processor or core or central processing unit (CPU) as shown in FIG. 6, where secondary code execution is performed on the second CPU. Execution of the secondary code on the second processor occurs in parallel with the processing of, for example, security sensitive code on the first CPU to detect fault injections directed at the security sensitive code. As can be seen in FIG. 6, when the device does not execute security related computations such as cryptographic algorithms, then the second CPU can be used for other purposes.

Figure 7:
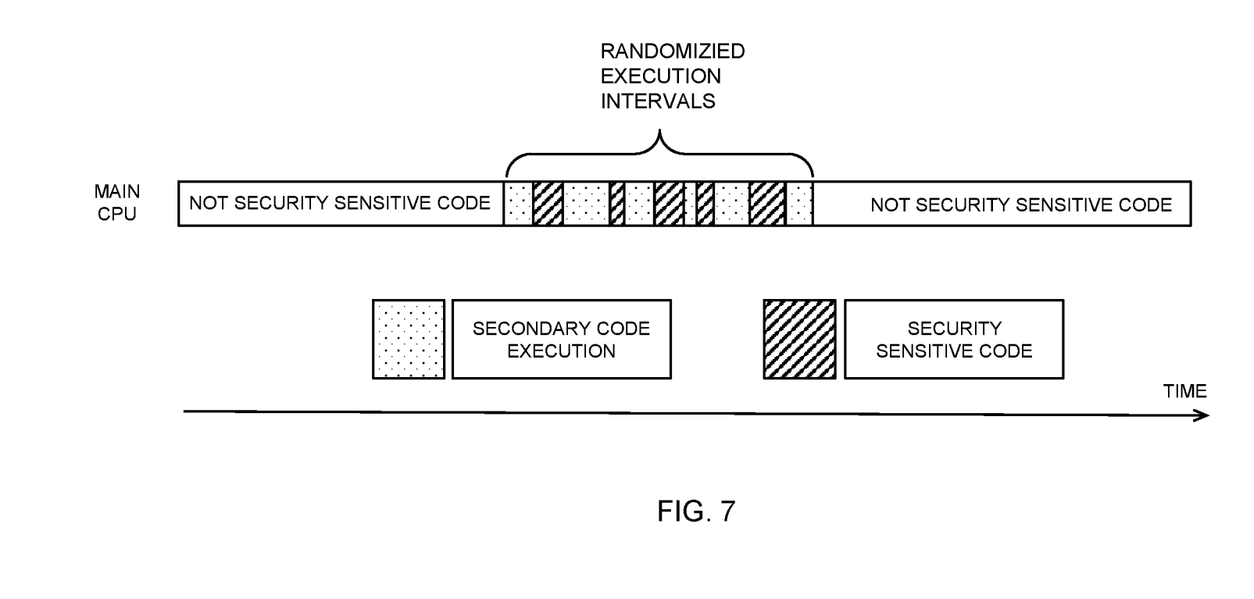
FIG. 7 illustrates a timing diagram of randomized execution of the secondary code and the security sensitive code on a single processor in accordance with an embodiment.

FIG. 7 illustrates a timing diagram of randomized execution of the secondary code and the security sensitive code on a single processor in accordance with an embodiment. Instead of the running the secondary code on a second processor, the secondary code together with the main code of the device may be run concurrently on the same CPU (core, processor) while switching between execution of the secondary code and the primary code. The switching may be done randomly if a random number generator is available on the processor. This can be also be done in a way similar to normal task switching. However, in the case of fault injection detection, it may be desirable to switch between the primary code execution and the secondary code execution after random intervals. This will make it more difficult for an attacker to target the primary code because the attacker does not know when the primary code is running. However, it may be even more difficult for the attacker if the attacker must target specific instructions in the primary code to inject a fault successfully.

Note, it is possible to combine the techniques of both FIG. 6 and FIG. 7. For example, one instance of the secondary code may be run on a separate CPU core and a second instance of the secondary code may be run on the same CPU that performs, e.g., cryptographic operations using scheduling between primary and secondary code.

Figure 8:
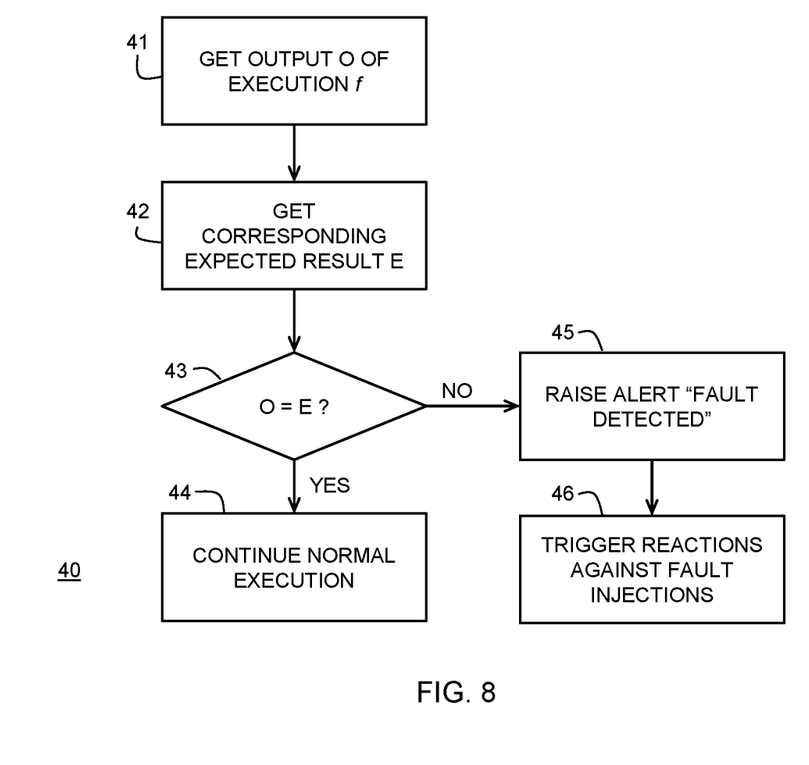
FIG. 8 illustrates a method for detecting a fault injection in accordance with an embodiment.

FIG. 8 illustrates a method 40 for detecting a fault injection in accordance with an embodiment. The method begins at step 41. At steps 41 and 42, output O of execution of function f and corresponding pre-computed known expected result E are retrieved. At step 43, output O and known expected result E are compared. When the secondary code gets the results from the execution of f and compares them to the expected results E it can trigger a response against the faults if the results do not match as shown at steps 45 and 46. The specific response might depend on the type of the device, its application as well as the type of the security incident that may occur if a faulty result is used in further computations. For example, as a reaction to a fault detection, the device may be rebooted, the device or a portion of the device may be reset, execution of the security sensitive code may be restarted to try to get a correct non-faulty result, code execution may be stopped, additional user input may be requested, an alert message may be sent to a remote server, etc. However, if no fault is detected, normal execution continues at step 44.

Figure 9:
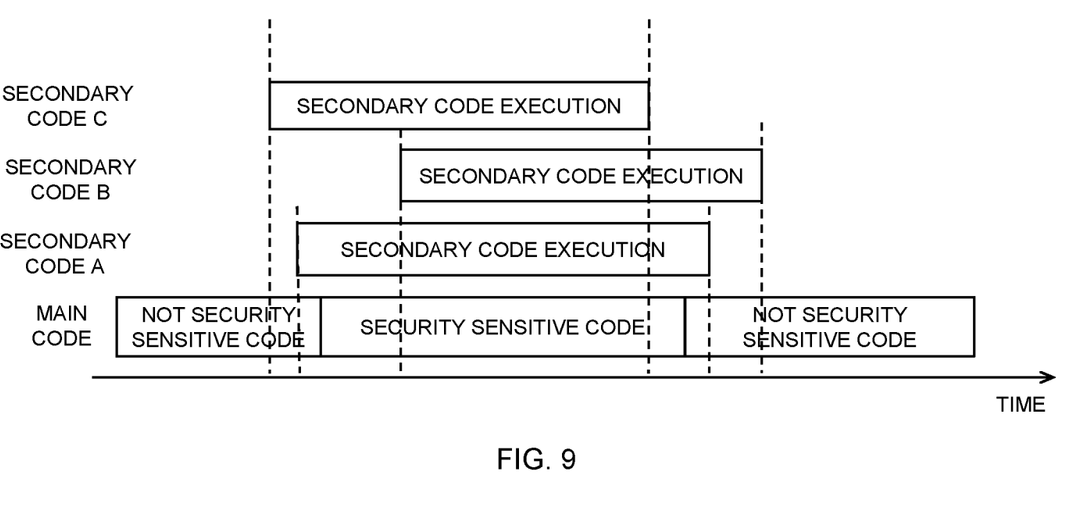
FIG. 9 illustrates a timing diagram of the use of multiple secondary code executions in accordance with an embodiment.

FIG. 9 illustrates a timing diagram of the use of multiple secondary code executions in accordance with an embodiment. An attacker may try to inject more than one fault to corrupt the results of the execution of the security sensitive code as well as to try to circumvent the protection provided by the described secondary code execution. It is possible to improve the security of the detection mechanism and of the secondary code by varying execution times (run f more times) and by varying the execution start time. In one embodiment, the start times may be randomly chosen. Also, multiple secondary codes A-C may be executed in parallel for better protection. The start times of the multiple secondary codes may be different, and the secondary codes may be different from each other. Note, that in a case when multiple secondary codes are used in the system it is no longer important that one secondary code "covers" the entire security sensitive part of the main code like shown in FIG. 5A. But, that the sum of all secondary code execution (time) covers the primary code to be provided, such as for example, a security sensitive code.

Figure 10:
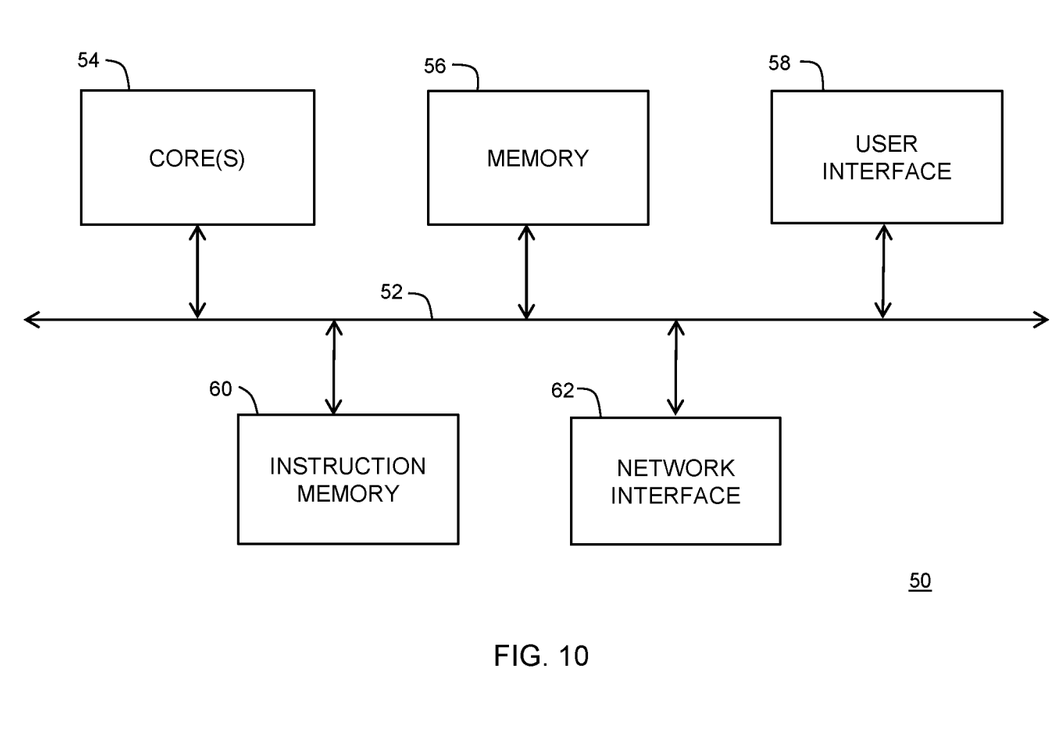
FIG. 10 illustrates a data processor suitable for use in the fault injection detection method in accordance with an embodiment.

FIG. 10 illustrates a data processing system 50 suitable for use in the fault injection detection method in accordance with an embodiment. Data processing system 50 may be implemented on one or more integrated circuits and may be used in an implementation of the described embodiments. Data processing system 50 includes bus, or switch network 52. Various modules or circuits may be connected to bus 52. For example, connected to bus 52 in FIG. 10 are one or more processor cores 54, memory 56, user interface 58, instruction memory 60, and network interface 62. The one or more processor cores 54 may include any hardware device capable of executing instructions stored in memory 56 or instruction memory 60. For example, processor cores 54 may execute the primary and secondary code used to detect fault injection. Processor cores 54 may be, for example, a microprocessor, field programmable gate array (FPGA), application-specific integrated circuit (ASIC), or similar device. Processor cores 54 may be implemented in a secure hardware element and may be tamper resistant.

Memory 56 may be any kind of memory, such as for example, L1, L2, or L3 cache or system memory. Memory 56 may include volatile memory such as static random-access memory (SRAM) or dynamic RAM (DRAM), or may include non-volatile memory such as flash memory, read only memory (ROM), or other volatile or non-volatile memory. Also, memory 56 may be implemented in a secure hardware element. Alternately, memory 56 may be a hard drive implemented externally to data processing system 50. In one embodiment, memory 56 is used to store software or data required for running a fault detector and the method for detecting a fault injection.

User interface 58 may be connected to one or more devices for enabling communication with a user such as an administrator. For example, user interface 58 may be enabled for coupling to a display, a mouse, a keyboard, or other input/output device. Network interface 62 may include one or more circuits for enabling communication with other hardware devices. For example, network interface 62 may include, or be coupled to, a network interface card (NIC) configured to communicate according to the Ethernet protocol. Also, network interface 62 may implement a TCP/IP stack for communication according to the TCP/IP protocols. Data samples for classification may be input via network interface 62, or similar interface. Various other hardware or configurations for communicating are available.

Instruction memory 60 may include one or more machine-readable non-transient storage media for storing instructions for execution by processor cores 54. In other embodiments, both memories 56 and 60 may store data upon which processor cores 54 may operate. Memories 56 and 60 may also store, for example, encryption, decryption, and verification applications. Memories 56 and 60 may be implemented in a secure hardware element and may be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting a fault injection attack in a data processing system, the method comprising:
    providing a secondary code, the secondary code including a predetermined function with a known expected result when executed with a known tested input;
    executing a primary code in the data processing system;
    executing the secondary code in parallel with the primary code in the data processing system to produce an output, wherein the execution is switched between the primary code and the secondary code, and wherein the primary code and the secondary code are executed using randomized intervals of the primary and secondary code execution on a single processor of the data processing system; and
    comparing the output with the known expected result to detect the fault injection attack of the data processing system.

2. The method of claim 1, wherein the primary code is a security sensitive code.

3. The method of claim 1 further comprising providing the secondary code with a plurality of functions and executing the secondary code on a plurality of inputs to produce a plurality of outputs, and wherein each output of the plurality of outputs is compared to a corresponding known expected result of a plurality of known expected results of execution of the secondary code to detect the fault injection attack.

4. The method of claim 1 further comprising providing the secondary code with a plurality of functions, wherein each function of the plurality of functions is executed in a serial order to produce a final output, and wherein the final output is compared to a known expected result of execution of the secondary code to detect the fault injection attack.

5. The method of claim 1 further comprising providing an indication that the output and the known expected result do not match.

6. A method for detecting a fault injection attack in a data processing system, the method comprising:
    providing a secondary code, the secondary code including a predetermined function with a known expected result when executed with a known tested input;
    executing a primary code in the data processing system;
    executing the secondary code in parallel with the primary code in the data processing system to produce an output;
    comparing the output with the known expected result to detect the fault injection attack of the data processing system;
    providing the secondary code with a plurality of functions, wherein execution of each function of the plurality of functions has an expected known result, wherein each function of the plurality of functions is executed in a serial sequence to produce a plurality of serial outputs, and wherein each output of the plurality of outputs is compared to a corresponding known expected result of a plurality of known expected results of the plurality of serial outputs, wherein each function of the plurality of functions is different, and each function provides a different expected known result.

7. The method of claim 6, wherein executing the secondary code in parallel with the primary code comprises beginning execution of the secondary code at the same time as or before beginning execution of the primary code and ending execution of the secondary code at the same time as or after ending execution of the primary code.

8. The method of claim 6, wherein executing the primary code and the secondary code further comprises executing the primary code on a first processor core of the data processing system and executing the secondary code on a second processor core of the data processing system.

9. The method of claim 6, wherein executing the secondary code further comprises executing a plurality of secondary codes in parallel with the primary code, each of the plurality of secondary codes having different code lengths and different beginning times.

10. A method for detecting a fault injection attack in a data processing system, the method comprising:
providing a secondary code, the secondary code including a predetermined function with a known expected result;
executing a security sensitive code in the data processing system;
executing the secondary code in parallel with execution of the security sensitive code in the data processing system to produce an output, wherein executing the secondary code further comprises executing a plurality of secondary codes in parallel with the security sensitive code, each of the plurality of secondary codes having different code lengths and different beginning times, and wherein together, at least one of the plurality of secondary code execution times begin before a beginning of the execution of the security sensitive code, and at least one of the plurality of code execution times extends after an ending of the execution of the security sensitive code; and
comparing the output with the known expected result to detect the fault injection attack of the data processing system.

11. The method of claim 10 further comprising providing the secondary code with a plurality of functions and executing the secondary code on a plurality of inputs to produce a plurality of outputs, and wherein each output of the plurality of outputs is compared to a corresponding known expected result of a plurality of known expected results of execution of the secondary code to detect the fault injection attack.

12. The method of claim 10 further comprising providing the secondary code with a plurality of functions, wherein each function of the plurality of functions is executed in a serial order to produce a final output, and wherein the final output is compared to a known expected result of execution of the secondary code to detect the fault injection attack.

13. The method of claim 10 further comprising providing the secondary code with a plurality of functions, wherein execution of each function of the plurality of functions has an expected known result, wherein each function of the plurality of functions is executed in a serial sequence to produce a plurality of serial outputs, and wherein each output of the plurality of outputs is compared to a corresponding known expected result of a plurality of known expected results of the plurality of serial outputs.

14. The method of claim 10, wherein executing the security sensitive code and the secondary code further comprises executing the security sensitive code on a first processor core of the data processing system and executing the secondary code on a second processor core of the data processing system.

15. The method of claim 10, wherein executing the security sensitive code and executing the secondary code further comprises using randomized intervals of the security sensitive code and the secondary code execution on a single processor of the data processing system.

16. The method of claim 10 further comprising providing an indication that the output and the known expected result do not match.

17. The method of claim 10, wherein the secondary code includes a hash function or an encryption function.

\* \* \* \* \*